United States Patent
Burgess et al.

(10) Patent No.: US 6,532,228 B1
(45) Date of Patent: Mar. 11, 2003

(54) OPEN LOOP RECEIVER

(75) Inventors: Paul Burgess, Bochum (DE); Markus Schetelig, Essen (DE)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/404,717

(22) Filed: Sep. 24, 1999

(30) Foreign Application Priority Data

Sep. 24, 1998 (GB) .............................. 9820858

(51) Int. Cl.[7] .............................. H04Q 7/20; H04Q 7/12; H04Q 7/32
(52) U.S. Cl. ...................... 370/349; 370/311; 370/313; 370/336; 370/337; 370/345; 455/343
(58) Field of Search ................................ 465/343, 334, 465/550, 466, 255, 256, 264, 208, 227, 260, 265, 427, 517, 574; 370/311, 313, 314, 336, 337, 345, 347, 350, 349

(56) References Cited

U.S. PATENT DOCUMENTS 4,631,496 A * 12/1986 Borras et al. ............... 455/343
5,475,877 A   12/1995 Adachi
5,594,735 A * 1/1997 Jokura ....................... 455/343
5,613,235 A   3/1997 Kivari et al.
6,049,532 A * 4/2000 Steele et al. ................ 455/343

FOREIGN PATENT DOCUMENTS

| EP | 0 326 940 | 8/1989 |
| EP | 0 565 127 | 10/1993 |
| EP | 0 594 403 | 4/1994 |
| WO | 9702676 | 1/1997 |

* cited by examiner

Primary Examiner—William Trost
Assistant Examiner—Keith Ferguson
(74) Attorney, Agent, or Firm—Antonelli, Terry, Stout & Kraus, LLP

(57) ABSTRACT

A receiver for receiving a radio packet transmitted at a transmission frequency. Reception circuitry is arranged to receive radio signals at a receiving frequency. The reception circuitry includes a phase locked loop arranged to maintain the receiving frequency substantially equal to the transmission frequency; a detector which detects within the received radio signals a pre-defined sequence identifying the beginning of a radio packet; and disabling circuitry which disables the phase locked loop after the receipt of the sequence of radio signals identifying the beginning of a radio packet.

14 Claims, 3 Drawing Sheets

OPEN LOOP RECEIVER

BACKGROUND OF THE INVENTION

The present invention is applicable to receivers or transmitters for receiving or transmitting respectively a radio packet at a predetermined frequency. The invention particularly relates to power saving arising from the disablement of compensation means arranged to maintain the operating frequency of a transmitter or receiver substantially equal to a predetermined frequency.

Consider a communication system in which radio packets or messages are transmitted in defined time slots to different devices, and the different devices respond in their own separate time slots. In such a situation it may be necessary for a device to switch between receiving/transmitting at one frequency and receiving/transmitting at a different frequency.

It is desirable for this transition to be made quickly. A phase locked loop (PPL) may be used for this purpose. A reference signal is supplied to the PPL which produces at its output a signal with a frequency dependent upon the predetermined value of the reference signal. A transition in the reference signal causes a transition in the output signal. The PPL operates to allow the transition to occur quickly and to prevent variations of the output signal from the predetermined value.

One problem with PPLs is that they consume power. Typically a PPL comprises a voltage controlled oscillator (VCO) the output of which provides the PPL output and which is also fed back as a first input to a phase comparator. The second input to the phase comparator is the reference signal provided from a reference oscillator. The input voltage to the VCO is provided by a capacitor in a loop filter which is charged by a current source and discharged by a current sink. The phase comparator operates either the current source or sink depending upon whether the first input signal to the phase comparator lags or leads the second input to the phase comparator. In this way a feed back loop is established which stabilises the output of the VCO at a desired value, dependent upon the reference signal.

Current sources and sinks draw current and increase power consumption which may be undesirable. In EP-A-0,326,940 a PPL is described. In this PPL the amount of current sourced to or sunk from the capacitor is prevented from exceeding a threshold value by disabling either the current source or the current sink if the threshold is exceeded.

In EP-A-0,565,127 a system is described in which a primary transceiver and a mobile transceiver are communicating in a particular frequency channel f1 using time slots. In the mobile transceiver a transmitter and receiver are alternately turned on in respective receive and transmit slots. In a standby mode the transmitter is permanently turned off and the receiver is turned on in the receive slots. During the transmit slots the phase locked loop is opened preventing the capacitor in the loop filter from being charged or discharged via the phase detector. Power is saved by disabling at least the phase detector. The capacitor therefore stores energy and allows the PPL to operate at high speeds. In the talking mode the receiver is further turned on in an idle slot so that the mobile transceiver can search a different frequency channel f2 to determine if hand off to a different primary transceiver is required. The document is particular concerned with the problems of quickly switching the receiver from listening to channel f2 during an idle slot to listening to channel f1 in open loop in the immediately following receive slot. The PPL in the receiver, using a first loop filter, is turned on prior to the beginning of the idle slot and controls the receiver to receive on channel f2. The PPL is then adjusted towards the end of the idle slot to switch from using the first loop filter to using a second loop filter so that the receiver receives on channel f1. The PPL is then made open loop prior to the start of the receive slot which follows the idle slot.

Such a system relies on there being very good synchronisation between the time frame used in the mobile transceiver and the time frame used in the primary transceiver. However, synchronisation may be lost. For example, the primary transceiver may in some circumstances change its frame timing so that it can synchronise with another network. In this instance the mobile transceiver would loose its synchronisation with the primary transceiver or sophisticated techniques would be required to maintain synchronisation. This may result in the PPL being in open loop for too long. If a PPL is left in open loop for too long the capacitor may discharge via leakage currents causing a drift in the output frequency of the VCO. This in turn may cause bit errors in transmitted or received signals.

It would be desirable to provide an improved technique by which receivers could conserve power.

SUMMARY OF THE INVENTION

According to the present invention there is provided a receiver for receiving a radio packet transmitted at a transmission frequency, comprising: reception means arranged to receive radio signals at a receiving frequency, comprising compensation means arranged to maintain the receiving frequency substantially equal to said transmission frequency; detection means arranged to detect within the received radio signals a pre-defined sequence identifying the beginning of a radio packet; and disabling means responsive to said detection means, arranged to disable said compensation means after the receipt of the sequence of radio signals identifying the beginning of a radio packet The receiver therefore enters a low power mode after it has received the sequence identifying the beginning of a radio packet. In one embodiment the receiver has a PPL which is closed at the start of each receiving time slot but opens after a short time and then closes at the end of each time slot.

BRIEF DESCRIPTION OF THE DRAWINGS

For a better understanding of the present invention and to understand how the same may be carried into effect reference will now be made to the accompanying drawings in which.

DETAILED DESCRIPTION

Figure 1:
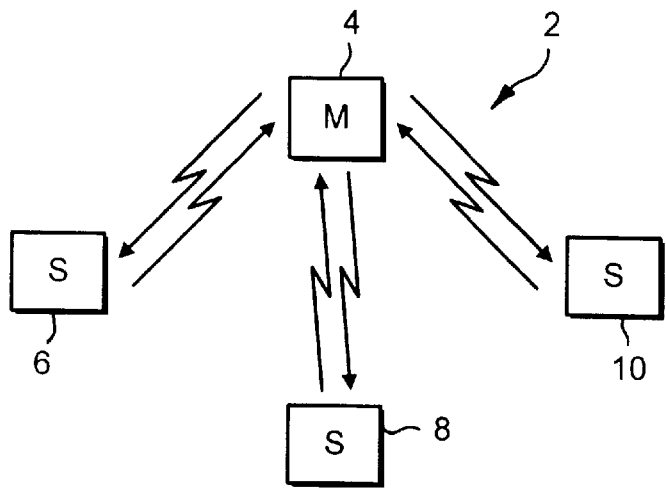
FIG. 1 illustrates a communications network including a master and slave units.

FIG. 1 illustrates a network 2 of radio transceiver units, including a master unit 4 and slave units 6, 8 and 10, communicating by transmitting and receiving radio packets. The master unit is the transceiver unit which initiates the connection of a slave to the network. There is only one master in a network. The network operates in a time division duplex fashion. The transceiver units are synchronised to a common time frame determined by the master unit 4. This time frame consists of a series of time slots of equal length. Each radio packet transmitted in the network has its start aligned with the start of a slot and a single packet is transmitted in the network at a time. When the master unit is performing point-to-point communication a transmitted radio packet is addressed to a particular transceiver which replies to the master unit by transmitting a radio packet addressed to the master unit in the next available time slot. When the master unit is performing point to multi-point communication a transmitted radio packet is addressed to all transceiver units. Any time misalignment between the master and a slave is corrected by adjusting the timing of the slave.

The transceivers transmit and receive in a microwave frequency band, typically 2.4 GHz. The network reduces interference by changing the frequency at which each radio packet is transmitted. A number of separate frequency channels are assigned each with a bandwidth of 1 MHz, and the frequency hops at a rate of 1600 hops/s. The frequency hopping of the transceivers communicating in or joining the network is synchronised and controlled by the master unit. The sequence of hopping frequencies is unique for the network and is determined by a unique identification of the master unit. Each transceiver unit has a unique identification, the Unit ID, henceforth referred to as the Slave ID for the slave units and the Master ID for a master unit.

The network is a radio frequency network suitable for transmitting voice information or data information between transceivers. The transmissions made are of low power, for example 0 to 20 dBm, and the transceiver units can effectively communicate over the range of a few centimetres to a few tens or hundred of metres. The master unit has the burden of identifying the other transceiver units within its transmission range and the burden of paging a transceiver unit to set up a communication link between the master unit and that slave unit. Each of the slave units has a low power mode in which it neither transmits nor receives and other modes in which it receives and then responds to radio packets addressed to it by the master unit. A slave unit may remain in the low power mode except when transmitting or receiving.

Figure 2:
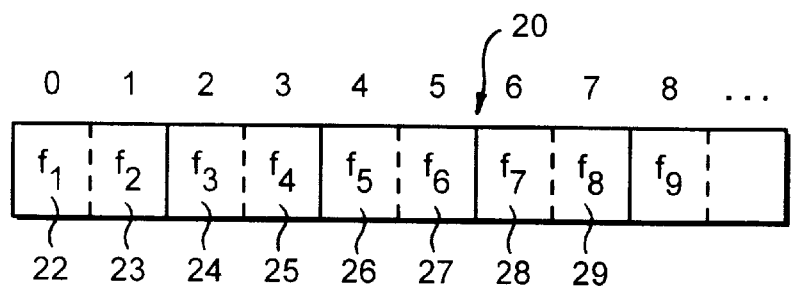
FIG. 2 illustrates the time frame of the communications network.

Referring to FIG. 2, a frame 20 is illustrated. This frame 20 is the common time frame used by the network 2 and controlled by the master unit 4. The frame illustratively has slots 22 to 29. The slots designated by even numbers are reserved. Only the master unit can begin transmitting a radio packet aligned with the start of the even numbered slots. The slots designated by odd numbers are reserved. Only radio packets transmitted by a slave, that is radio packets addressed for reception by the master unit can have their start aligned with the start of the odd numbered slots. Each slot is allocated a different one of a sequence of hopping frequencies. A slot has a constant time period and is typically 625 microseconds.

Figure 3:
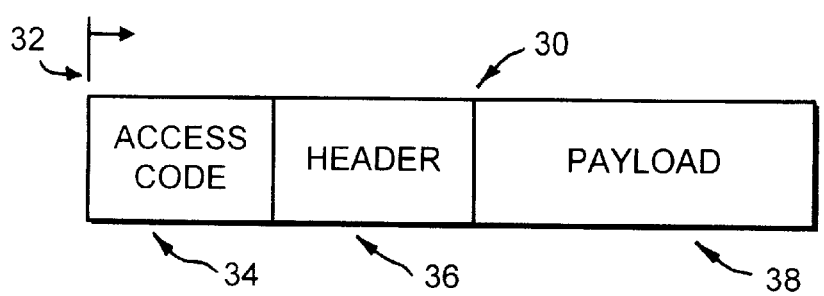
FIG. 3 illustrates a radio packet

Referring to FIG. 3, a typical radio packet 30 is illustrated. The radio packet has a start 32 and contains three distinct portions: a first portion contains an Access Code 34, a second portion contains a Header 36 and a third portion contains a Payload 38.

The Access Code is a series of symbols used in the network to identify the start of a radio packet. It has a fixed length. The Access Code may comprise a Master ID, a Slave ID or an Inquiry Access Code. In a normal communication mode, the master and slave units use the Master ID as the Access Code. As there is only one master unit in a network, the Master ID identifies the network. When the master unit is in a Page Mode and is paging a particular slave unit to set up a communication link between itself and the slave unit, the Slave ID is used as the Access Code when the master addresses the slave and the slave replies. When the master unit is in an Inquiry Mode, the Inquiry Access Code is used as the Access Code when the master unit addresses the transceiver unit s and when a unit replies. The Inquiry Access Code identifies a packet as one to which all transceiver units must respond by transmitting their Slave ID.

The header 36 may or may not be present. If present, it has a fixed length. The header contains control words. The local address (L_ADDR) is a word uniquely identifying a slave within a network. The local address is assigned to a slave unit by the master unit when the master unit joins the slave to the network. The all zero L_ADDR is reserved for broadcast purposes. The packet identification word (PK_ID) specifies the features of the radio packet 30. PK_ID specifies whether a payload is present and its size and whether the payload contains data or transceiver control information.

The payload 38 carries either transceiver control information or voice/data information. The payload is of variable length and may be absent. When a slave unit receives a packet transmitted by a master unit in the Inquiry Mode it transmits a packet containing transceiver control information in its payload. This controlling radio packet has a payload containing at least two control words. The first is the Unit ID (SLAVE ID) of the slave unit and the second is the value (SLAVE CLK) representing the local time kept by a clock in the slave unit. The controlling radio packet is used to allow the master to establish frequency and timing synchronisation with the slave. When a master unit is in the Page Mode it transmits a radio packet to the paged slave containing transceiver control information in its payload. This controlling radio packet has a payload containing at least two control words. The first is the Unit ID (MASTER ID) of the master unit and the second is a value (MASTER CLK) representing the local time kept by a clock in the master unit. The controlling radio packet is used by the slave to establish timing and frequency synchronisation with the master.

Figure 4:
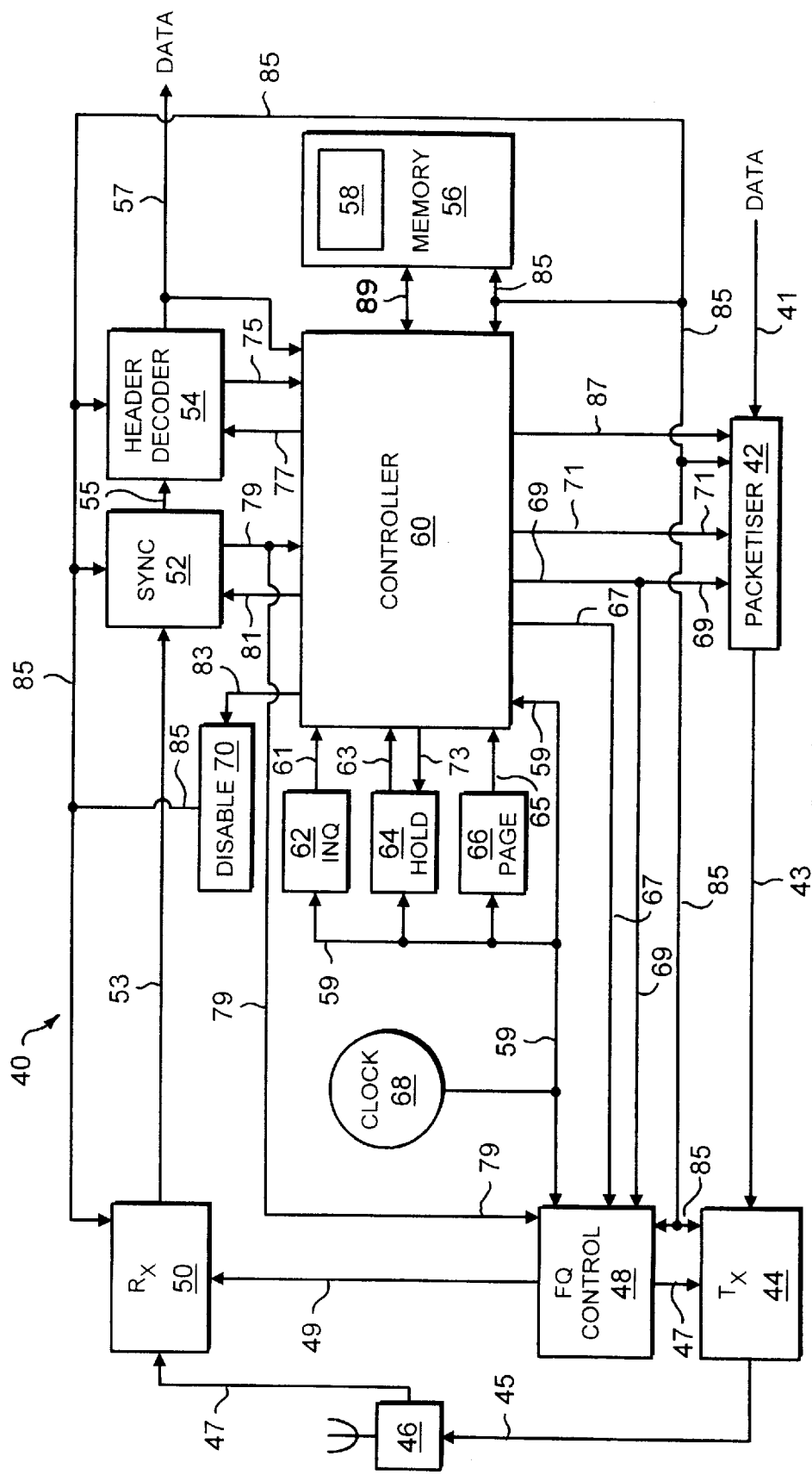
FIG. 4 illustrates a transceiver unit suitable for use as a master or slave.

Referring to FIG. 4, a schematic illustration of a transceiver unit is shown. Only as many functional blocks and interconnections are shown in this diagram as are necessary to explain in the following how a transceiver unit and the communication network operates. The transceiver unit 40 contains a number of functional elements including: an antenna 46, receiver 50, synchroniser 52, header decoder 54, controller 60, memory 56 having memory portion 58 storing the transceiver unit's Unit ID, disable circuitry 70, packetiser 42, clock 68, inquiry counter 62, hold counter 64, page scan counter 66, frequency hop controller 48 and transmitter 44. Although these elements are shown as separate elements they may in fact be integrated together and may be carried out in software or in hardware.

Data to be transmitted in the payload of a packet by the transceiver unit 40 is supplied as data signal 41 to the packetiser 42. Control information to be transmitted in the payload of a packet is supplied in a payload control signal 87 provided by the controller 60 to the packetiser 42. The packetiser 42 also receives an access code control signal 69 and a header control signal 71 from controller 60 which respectively control the Access Code 34 and the Header 36 attached to the payload to form the packet. The packetiser 42 places the data or control information into a packet 30 which is supplied as signal 43 to the transmitter 44. The transmitter 44 modulates a carrier wave in dependence upon the signal 43 to produce the transmitted signal 45 supplied to the antenna 46 for transmission. The frequency of the carrier wave is controlled to be one of a sequence of hop frequencies by a transmission frequency control signal 47 supplied by the frequency hop controller 48 to the transmitter 44.

The antenna 46 receives a radio signal 51 and supplies it to the receiver 50 which demodulates the radio signal 51 under the control of a reception frequency control signal 49 supplied by the frequency hopping controller 48 to produce a digital signal 53. The digital signal 53 is supplied to the synchroniser 52 which synchronises the transceiver unit 40 to the time frame of the network. The synchroniser is supplied with an access code signal 81 specifying the Access Code of the packet which the transceiver unit is expecting to receive. The synchroniser accepts those received radio packets with Access Codes which correspond to the expected Access Codes and rejects those received radio packets with Access Codes that do not correspond to the expected Access Code. A sliding correlation is used to identify the presence and the start of the expected Access Code in a radio packet. If the radio packet is accepted then the radio packet is supplied to the header decoder 54 as signal 55 and a confirmation signal 79 is returned to the controller 60 and the frequency hopping controller 48 indicating that the packet has been accepted by the synchroniser 52. The confirmation signal 79 is used by the controller in a slave unit to resynchronise the slave clock to the master clock. The controller compares the time at which a radio packet was received with the time at which the radio packet was expected to be received and shifts its timing to offset the difference. Such an offset may be achieved by varying the value of M_OFFSET stored in memory 56 by the value of the difference. The header decoder 54 decodes the header in the received packet and supplies it to the controller 60 as header signal 75. The header decoder 54, when enabled by a payload acceptance signal 77 supplied by the controller 60, produces a data output signal 57 containing the remainder of the radio packet, the payload 38. The controller responds to a zero value of L_ADDR in the header signal 75 to enable the header decoder. The data output signal 57 may contain transceiver control information. In this instance the data output signal 57 is supplied to controller 60 in response to the payload acceptance signal 77 provided by the controller 60.

The frequency-hopping controller 48 cycles through a sequence of frequencies. The transmission frequency control signal 47 and the reception frequency control signal 49 alternately control the transmitter 44 and the receiver 50. When the transceiver 40 is acting as a master, the receiver 50 is capable of receiving at frequencies determined by the odd values of the sequence and the transmitter is capable of transmitting at frequencies determined by the even values of the sequence. When the transceiver is acting as a slave unit the reverse is true. The frequency-hopping controller 48 receives the access code control signal 69 (also supplied to the packetiser 42) and an offset signal 67 from the controller 60 and a clock signal 59, which represents the time held in clock 68, from the clock 68. The offset signal 67 defines the value of an offset from the time held in the clock 68. This value may be null. The frequency-hopping controller combines the clock signal 59 and the offset signal 67 to emulate the time held in a clock offset by the value of the offset signal 67 from the clock 68. The sequence of frequencies through which the hopping controller 48 cycles is dependent upon the access code control signal 69. The position within the cycle is dependent upon the emulated time. When the access code control signal 69 provides the value MASTER ID a master unit frequency-hopping sequence is defined. When the access code control signal 69 provides the value SLAVE ID a slave unit frequency-hopping sequence is defined.

The clock 68 also supplies the clock signal 59 to controller 60, the inquiry counter 62, the hold counter 64 and the page scan counter 66. Each of the counters contains values which are decremented with each clock cycle of the clock 68. The counters supply a control signal to the controller 60 when the decremented value reaches a predetermined threshold. The inquiry counter 62 produces an inquiry control signal 61 every few seconds. This signal causes the transceiver unit 40 to enter the Inquiry Mode and the counter 62 to be reset.

The hold counter 64 produces a hold disable signal 63 which causes the transceiver unit to exit a Hold Mode. The controller 60 initiates a Hold Mode by writing a value into the Hold counter 54 via write signal 73. The page scan counter 66 produces a page scan control signal 65 every few seconds. This signal causes the transceiver unit to enter the Page Scan Mode and the counter 66 to be reset.

Disable circuitry 70 provides an enable signal 85 to the receiver 50, the synchroniser 52, the header decoder 54, the frequency-hopping controller 48, the transmitter 44 and the packetiser 42, the memory 56 and the controller 60 in the absence of which these elements would be switched off. The disable circuitry responds to an asserted disable control signal 83 supplied by the controller 60 to disassert the enable signal 85.

The memory 56 and the controller 60 communicate with each other via line 89. The memory 56 has a portion 58 which permanently stores the Unit ID of the transceiver unit 40 and the common Inquiry Access Code. The remaining portion of the memory 56 can be written to by the controller 60. If the transceiver unit 40 is functioning as a slave unit, the memory 56 will additionally store the Master ID, a value M_OFFSET representing the difference between the slave unit's clock and the mater unit's clock and the slave's address in the network, L_addr. If the transceiver unit 40 is functioning as a master unit, the memory 56 will additionally store for each slave unit participating in the network: the Slave ID; a value S_OFFSET representing the difference between the master unit's clock and that particular slave unit's clock and L_ADDR uniquely identifying the particular slave unit in the network.

It should be noted that the access code signal 81, the access code control signal 69 and the offset signal 67 remain the same for adjacent duplex time slots, and that the access code signal 81 and the access code control signal 69 will have the same values.

The transceiver unit has various modes of operation including: the Standby Mode, the Communication Mode, the Inquiry Mode, the Page Mode, and the Hold Mode. The operation of the controller 40 in each of these modes may depend upon whether the transceiver unit is functioning as a master or as a slave.

Standby Mode

Before a transceiver unit 40 has been connected to a network it is in Standby Mode. To enter this Mode the controller 60 activates the disable control signal 83. The receiver 50, the transmitter 44, the synchroniser 52, the frequency-hopping controller 48, the header decoder 54, the packetiser 42, disable circuitry 70 and the controller 60 are disabled and do not draw power. Only the clock 68 and the counters 62, 64 and 66 are operational. In this mode power consumption is very low.

Inquiry Mode

Before a master unit can set up a communication network or join a transceiver unit to an existing network it needs to 'know' what transceiver units are within its transmission range. The master unit broadcasts inquiry radio packets in even numbered time slots. Each of the packets has the Inquiry Access Code as its Access Code and the zero L_ADDR in its header. If a slave unit is within range and is also in an Inquiry Mode it will respond in an odd numbered time slot, by transmitting a packet which has the Inquiry Access Code as its Access Code and has, in its payload, the SLAVE ID and SLAVE CLK of the slave unit.

Paging

Before a master unit can join a transceiver to the communication network it needs to give the slave unit some network parameters in the payload of the paging radio packet. These parameters include: the MASTER ID so that the slave unit can recognise packets transmitted by the master unit and can emulate the master unit's frequency-hopping sequence; M_OFFSET so that the slave unit can keep in step with the master unit's time frame and frequency hopping; and L_ADDR so that the slave unit can recognise a packet addressed to it by the master unit. The master unit communicates these network parameters to the slave unit in the payload of a packet while emulating the slave unit's frequency-hopping sequence and keeping in step by emulating the slave's clock using SLAVE_ID as the value of access code control signal 69 and S_OFFSET as the value of offset signal 67. Once a communication link has been established between the master and slave they communicate using the master unit's frequency-hopping sequence. Each of the packets transmitted during paging has as its Access Code the SLAVE ID of the slave unit paged. The packets transmitted from master to slave unit are in even numbered time slots and the slave responds to the reception of these packets by transmitting packets in the associated duplex slot i.e. the immediately following odd numbered slot.

Communication Mode

In the communication mode, a slave can only transmit and must transmit in the slot immediately after that in which it was addressed. An exception to this is if the master unit is broadcasting, that is, transmitting to all slave units simultaneously. All packets transmitted in the communication mode have an Access Code determined by the MASTER ID and a frequency determined by the master unit's frequency-hopping sequence. The slave units emulate the master unit's frequency-hopping sequence using the stored value of MASTER ID as the access code control signal 69 and the stored value of M_OFFSET as the value of the offset signal 67 and synchronise their timing to the master unit using their own clock signal 59 and their stored value of M_OFFSET. The master addresses a particular slave unit by placing its unique address, L_ADDR, read from memory 56, in the header of a packet. The payloads of the packets transmitted may contain data or control information such as updated network parameters.

Figure 5:
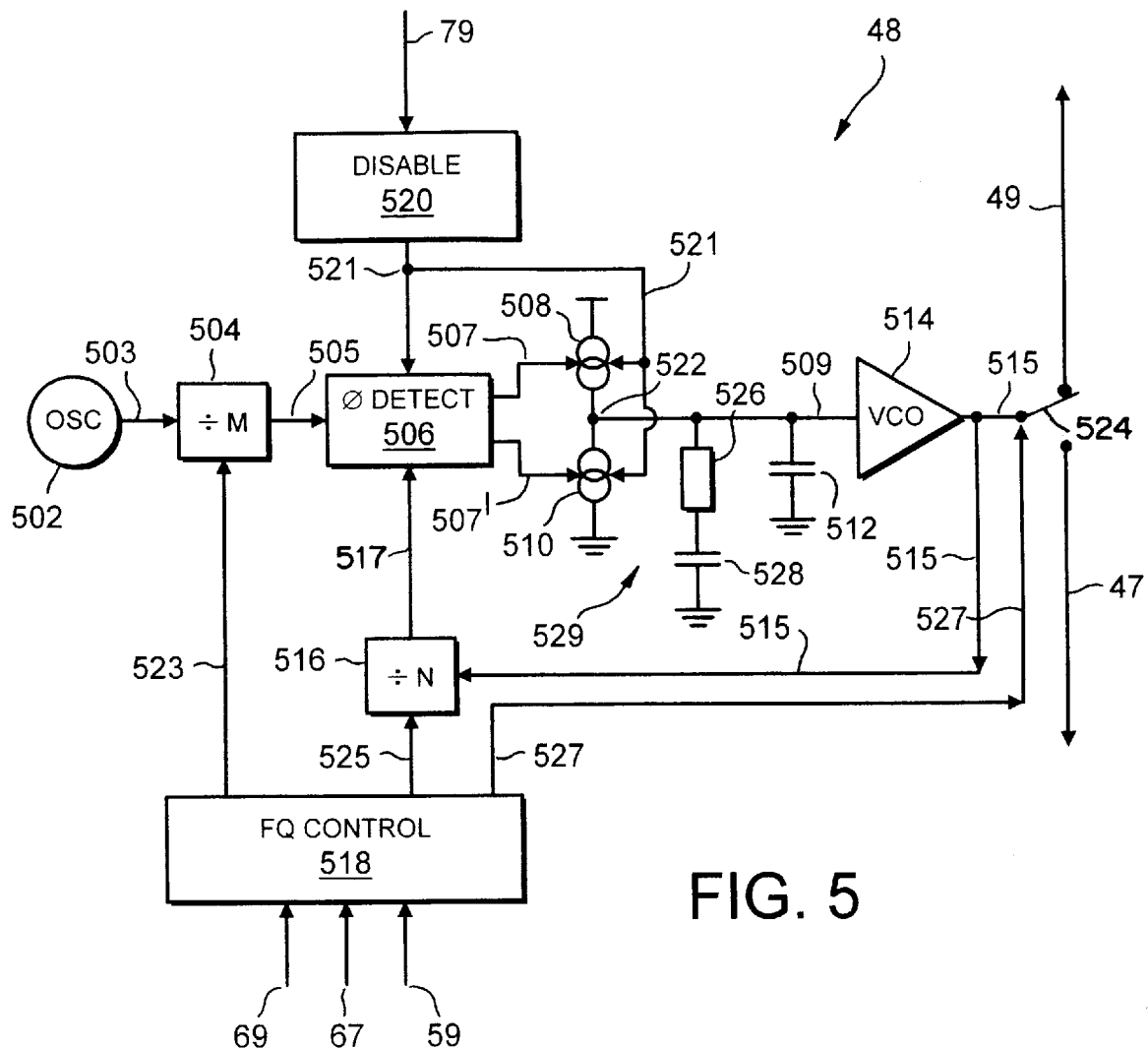
FIG. 5 illustrates a frequency synthesiser, incorporating a PPL, adapted in accordance with one embodiment of the invention.

The frequency hopping controller 48 is illustrated in more detail in FIG. 5. The frequency hopping controller 48 as previously illustrated in FIG. 4, receives as inputs the confirmation signal 79 from the synchroniser 52, the access code signal 69 and the offset signal 67 from the controller 60, and the clock signal 59 from the clock 68 and produces as an output either the reception control signal 49 or the transmission control signal 47 which are respectively supplied to the receiver 50 and the transmitter 44. The frequency hopping controller 48 includes an oscillator 502, a first frequency divider 504, a phase detector 506, a current source 508, a current sink 510, a loop filter 529 comprising serially connected resistor 526 and capacitor 528, a capacitor 512, a voltage controlled oscillator 514, a second frequency divider 516, a frequency controller 518, disable circuitry 520 and switch 524. The frequency hopping controller is a frequency synthesiser which produces an operational frequency signal 515. This operational frequency signal 515 is supplied to switch 524 which alternately provides the reception control signal 49 and the transmission control signal 47 under the control of switching signal 527 supplied by the frequency controller 518.

The oscillator 502 is typically a crystal oscillator and supplies a reference frequency signal 503 to the first frequency divider 504. The first frequency divider 504 produces an output signal 505 which has a frequency $1/M^{th}$ the value of the reference frequency. The value of M can be varied by programming the frequency divider 504 via a first frequency divider control signal 523 supplied by the frequency controller 518. The output signal 505 is supplied as the first input to the phase detector 506. The second input to the phase detector 506 is derived from the operational frequency signal 515. The operational frequency signal 515 is supplied to the second frequency divider 516. The second frequency divider 516 produces an adapted operational frequency signal 517 which has $1/N^{th}$ the value of the operational frequency signal 515 and which is supplied to the second input of the phase detector 506. The value of N can be varied by programming the second frequency divider 516 via a second frequency divider control signal 525 supplied by the frequency controller 518. The phase detector 506 compares the phases of the signals 505 and 517 received at its first and second inputs. If the adapted operational frequency signal 517 lags the output signal 505, then the phase detector 506 switches on the current source 508 via a first control signal 507 to supply current 509. If the adapted operational frequency signal 517 leads the output signal 505 then the phase detector 506 switches on the current sink 510 via a second control signal 507' to drain current 509. The current source 508 is connected between a-voltage source and a node 522. The current sink is connected between ground and the node 522. The loop filter 529 is connected between the node 522 and ground. The capacitance 512 exists between the node 522 and ground, and the input to the voltage controlled oscillator 514 is connected to the node 522. The output of the voltage controlled oscillator is connected to the second frequency divider 516 and the switch 524.

When the adapted operational frequency signal 517 lags the output signal 505, the current source 508 is activated and the current sink 510 is deactivated. The capacitance 512 charges, and the voltage at the node 522 rises. The VCO 514 varies the operational frequency signal in dependence on the voltage at the node 522. This signal is fed back via the second frequency divider 516 to the phase detector 506 and the lag is reduced.

When the adapted operational frequency signal 517 leads the output signal 505, the current source 508 is deactivated and the current sink 510 is activated. The capacitance 512 discharges, and the voltage at the node 522 falls. The VCO 514 varies the operational frequency signal in dependence on the voltage at the node 522. The signal is fed back via the second frequency divider 516 to the phase detector 506 and the lead is reduced.

The frequency controller 518 in FIG. 5 receives the access code signal 69, the offset signal 67 and the clock signal 59. It produces the first and second frequency divider control signals 523 and 525 and the switching signal 527. The frequency controller 518 determines the value of the operational frequency signal 515 by varying the values of M and N in the first and second frequency dividers 504 and 516 respectively and controls the switch 524 which determines whether the operational frequency signal 515 is provided as the reception control signal 49 or the transmission control signal 47. The access code signal supplies an access code which is used to create a hopping sequence. The operational frequency signal 515 follows such a sequence. The offset signal 67 and the clock signal 59 are combined to create an emulated time. This emulated time determines a position within the hopping sequence and a value for the operational frequency signal 515. The frequency controller 518 sets the values of M and N to achieve such an operational frequency signal 515. The frequency controller 518 hops from one frequency in the hopping sequence to the next frequency in the sequence at the boundary between time slots. When the frequency controller hops, it activates the switch 524. Hence, the operational frequency signal hops every time slot and is supplied in alternate slots as the reception control signal 49 and the transmission control signal 47.

The disable circuitry 520 receives the confirmation signal 79 from synchronizer 36 and responds to this signal by producing a disable signal 521 which disables the phase detector 506, the current sink 510 and the current source 508. The phase detector 506, the current sink 510 and the current source 508 when disabled do not draw power, or draw substantially reduced power. The disable circuitry stops disabling the phase detector 506, the current sink 510 and the current source 508 either after a predetermined time, so that the PPL is closed at the beginning of the next time slot, or in response to either one of the frequency divider control signals 523 and 525 indicating that the frequency has hopped.

The synchroniser 52 uses a sliding correlation to identify the presence of an expected Access Code in a received radio packet. The synchroniser accepts those received radio packets with Access Codes which correspond to the expected Access Codes and rejects those received radio packets with Access Codes that do not correspond to the expected Access Code. If the radio packet is accepted by the synchroniser 52 then the confirmation signal 79 is returned to the controller 60 and the disable circuitry 520 indicating that the packet has been accepted by the synchroniser 52. The confirmation signal 79 is also used by the controller in a slave unit to resynchronise the slave clock to the master clock.

Consequently the phase locked loop is placed in open loop after the beginning of a time slot and after a proportion of the radio packet has been received. Furthermore, the phase locked loop is placed in open loop only when the communicating master and slave units are synchronised.

Transceivers such as that illustrated in FIG. 4, may form part of different devices such as mobile phones, computers, pagers, a computer mouse, headsets, microphones etc. Such transceivers allow the devices to form a communication network and exchange data or control information via the network.

The preceding description describes a preferred implementation of the claimed invention in a preferred application, namely a low power radio frequency communications network. However, it should be appreciated that other implementations and applications may be utilised without departing from the scope of the invention as claimed.

What is claimed is:

1. A receiver for receiving a complete radio packet transmitted at a transmission frequency, the packet including a pre-defined sequence and a payload of variable length, said receiver comprising:
   reception means arranged to receive radio signals at a receiving frequency, said reception means including compensation means arranged to maintain the receiving frequency substantially equal to the transmission frequency;
   detection means arranged to detect within the received radio signals a pre-defined sequence identifying the beginning of a received radio packet; and
   disabling means responsive to said detection means, arranged to disable said compensation means after the detection of the pre-defined sequence identifying the beginning of the received radio packet, but before the payload of the received packet has been received, whereby said reception means receives the payload of the received packet with said compensation means disabled.

2. A receiver as claimed in claim 1, wherein said reception means includes a frequency synthesiser the frequency output of which determines the receiving frequency.

3. A receiver as claimed in claim 1, wherein said compensation means comprises a reference source for providing a first signal dependent upon the transmission frequency, a feed back loop for providing a second signal dependent upon the receiving frequency, comparison means for comparing the first and second signals, and control means for controlling the receiving frequency in dependence upon the comparison.

4. A receiver as claimed in claim 3, wherein said disabling means disables said control means.

5. A receiver as claimed in claim 3, wherein said reference source comprises an oscillator and programmable means for adjusting the output signal of said oscillator to provide the first signal.

6. A receiver as claimed in claim 3, wherein said feed back loop includes programmable means for adjusting the second signal.

7. A receiver as claimed in claim 3, wherein said comparison means comprises a phase detector.

8. A receiver as claimed in claim 3, wherein said control means comprises a capacitor, a voltage controlled oscillator having its input connected to said capacitor, and means for sourcing and sinking current to said capacitor and thereby control the output of said voltage controlled oscillator and the receiving frequency.

9. A receiver as claimed in claim 8, wherein said means for sourcing and sinking current comprises a current source arranged when enabled to provide a first current to said capacitor, and a current sink arranged when enabled to draw a second current from said capacitor.

10. A receiver as claimed in claim 9, wherein said disabling means simultaneously disables said current source and said current sink.

11. A receiver as claimed in claim 1, wherein said detection means comprises means for correlating sequences of received radio signals with the pre-defined sequence of signals.

12. A mobile phone comprising a receiver as claimed in claim 1.

13. An accessory for a mobile phone comprising a receiver as claimed in claim 1.

14. A communication system comprising a plurality of transceivers, wherein each transceiver comprises a receiver as claimed in claim 1.

* * * * *